United States Patent [19]

Eckberg et al.

[11] Patent Number: 5,178,959
[45] Date of Patent: Jan. 12, 1993

[54] EPOXY-FUNCTIONAL FLUOROSILICONES

[75] Inventors: Richard P. Eckberg, Saratoga Springs; Edwin R. Evans, Clifton Park, both of N.Y.

[73] Assignee: General Electric Company, Waterford, N.Y.

[21] Appl. No.: 676,155

[22] Filed: Mar. 27, 1991

[51] Int. Cl.$^5$ .................. B32B 9/04; C08G 77/06
[52] U.S. Cl. ........................................ 428/447; 528/15; 528/31; 528/27; 528/33; 528/25; 528/42; 522/31; 522/148
[58] Field of Search .......... 528/15, 31, 27, 33, 528/25, 42; 428/447; 522/31, 148

[56] References Cited

U.S. PATENT DOCUMENTS

| | | | |
|---|---|---|---|
| 3,455,877 | 7/1969 | Plueddemann | 549/215 |
| 4,208,503 | 6/1980 | Martin | 528/21 |
| 4,279,717 | 7/1981 | Eckberg et al. | 528/27 |
| 4,576,999 | 3/1986 | Eckberg | 525/476 |
| 4,585,848 | 4/1986 | Evans et al. | 528/15 |
| 4,599,374 | 7/1986 | Bluestein | 523/213 |
| 4,640,967 | 2/1987 | Eckberg | 528/26 |
| 4,684,709 | 8/1987 | Ona et al. | 528/27 |
| 4,777,233 | 10/1988 | Suzuki et al. | 522/148 |
| 4,990,546 | 2/1991 | Eckberg | 522/31 |
| 4,994,299 | 2/1991 | Stein et al. | 522/31 |
| 5,057,358 | 10/1991 | Riding et al. | 428/209 |

*Primary Examiner*—John C. Bleutge
*Assistant Examiner*—Margaret W. Glad

[57] ABSTRACT

Novel epoxy-functional fluorosilicones and UV-curable compositions containing these epoxy-functional fluorosilicones in combination with onium salt photoinitiators are provided, the UV-curable compositions having improved cure efficiency and improved solvent and fuel resistance as compared to epoxy-functional silicones containing only non-fluorinated organic groups. Such compositions are useful as conformal coatings, optical fiber coatings, and electrical encapsulation.

31 Claims, No Drawings

EPOXY-FUNCTIONAL FLUOROSILICONES

CROSS REFERENCE TO RELATED APPLICATIONS

Reference is made to the concurrently filed application identified as, Ser. No. 07/676,906, filed Mar. 27, 1991.

BACKGROUND OF THE INVENTION

The present invention relates to novel epoxy-functional fluorosilicones. More particularly, the present invention relates to novel epoxy-functional fluorosilicones which in combination with onium salt photoinitiators will form UV-curable compositions having improved cure rate at low temperatures and improved solvent and fuel resistance.

Ultraviolet radiation curable compositions containing epoxy-functional silicones and onium salt photocatalysts are known in the art. Reference is made, for example, to U.S. Pat. No. 4,279,717 (Eckberg et al.); U.S. Pat. No. 4,576,999 (Eckberg); and U.S. Pat. No. 4,640,967 (Eckberg). The epoxy-functional silicones disclosed in these patents do not contain fluorine substituents.

Although the epoxy-functional silicones disclosed in the patents recited above form excellent UV-curable compositions, it is continually desirable to provide improved UV-curable epoxy-functional compositions.

For example, it is desirable to improve the cure efficiency of UV-curable compositions.

It is also desirable to improve the solvent and fuel resistance of UV-curable compositions.

In addition, it is desirable to provide epoxy-functional silicones which are more miscible with onium salt photoinitators than currently used UV-curable epoxy-functional compositions.

The present invention provides UV-curable compositions having the improvements listed above.

Fluorosilicone compositions are also known in the art. Reference is made, for example, to U.S. Pat. Nos. 4,585,848 (Evans et al.) and 4,599,374 (Bluestein). These patents disclose solvent resistant rubber compositions containing a vinyl-terminated fluorosilicone copolymer gum, a platinum curing agent, and a crosslinker. The fluorosilicone compositions taught in the patents to Evans et al. and to Bluestein are room temperature vulcanizable compositions.

The present invention is based on the discovery that epoxy-functional fluorosilicones having the structural formulas described hereinafter will form UV-curable compositions having improved solvent and fuel resistance and faster cure at lower UV radiation levels than non-fluoro containing epoxy-functional silicones of the prior art.

SUMMARY OF THE INVENTION

The present invention provides a novel epoxy-functional fluorosilicone selected from the group consisting of:

(A) linear epoxy-functional fluorosilicones having the general formula (I)

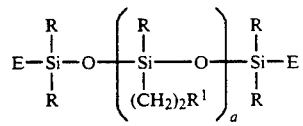

(B) epoxy-functional fluorosilicones having the general formula (II)

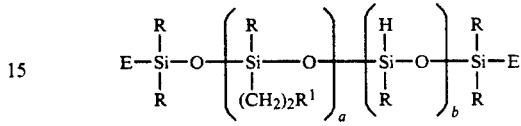

(C) resinous epoxy-functional fluorosilicones having the general formula (III)

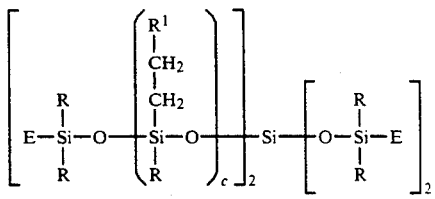

and (D) resinous epoxy-functional fluorosilicones having the general formula (IV)

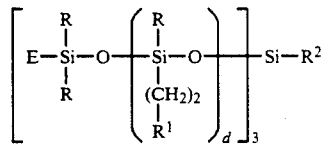

wherein E represents an epoxy-functional organic group of from about 2 to about 20 carbon atoms, R represents an alkyl radical having from 1 to about 10 carbon atoms, $R^1$ represents a perfluoroalkyl radical having from about 1 to about 8 carbon atoms, $R^2$ represents a an alkyl radical having from 1 to about 10 carbon atoms, "a" represents a number from 1 to about 100, "b" represents a number from 1 to about 100, "c" represents a number from 1 to about 100, and "d" represents a number from 1 to about 100.

The present invention is further directed to UV radiation-curable compositions comprising an epoxy-functional fluorosilicone and an onium salt photocatalyst or combination of onium salt photocatalysts.

The epoxy-functional fluorosilicones described above will form UV-curable compositions having improved solvent and fuel resistance and faster cure at lower UV radiation levels. The high solvent and fuel resistance of the compositions of this invention make them highly suitable for use in electrical encapsulation or conformal coatings in under-the-hood automotive applications or other applications where fuel and solvent resistance are necessary.

BACKGROUND OF THE INVENTION

The present invention is directed to novel epoxy-functional fluorosilicones and to UV-curable containing these epoxy-functional fluorosilicones and onium salt photocatalysts.

The epoxy-functional fluorosilicones of the present invention are selected from those having formulas (I)–(IV) above.

In formulas (I)–(IV), E represents an epoxy-functional organic group of from about 2 to about 20 carbon atoms. Preferably, E represents the radical

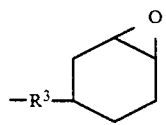

wherein $R^3$ is an alkylene radical having from 1 to about 10 carbon atoms, and most preferably an ethylene radical.

$R^1$ in formulas (I)–(IV) above is a perfluoroalkyl radical having from 1 to about 8 carbon atoms. Preferably, $R^1$ represents a $-CF_3$ radical.

In formulas (I)–(IV), R and $R^2$ each represent an alkyl radical having from 1 to about 10 carbon atoms, preferably methyl. The value for "a" is a number from 1 to about 100, preferably from about 3 to about 30, and most preferably from about 10 to about 20; "b" is a number from 1 to about 100, preferably from about 3 to about 30, and most preferably from about 10 to about 20; "c" is a number from 1 to about 100, preferably from about 1 to about 20, and most preferably from about 1 to about 10; and "d" is a number from 1 to about 100, preferably from about 1 to about 20, and most preferably from about 1 to about 10.

The epoxy-functional fluorosilicone of formula (I) can be prepared as follows. A fluorosilicone telomeric disiloxanol of the general formula $HO[(R^1CH_2CH_2)(R-)SiO]H$ is agitated with an organic solvent, e.g., toluene, under a blanket of nitrogen, and to the resulting mixture are added incremental amounts of dimethylchlorosilane. After addition of the organochlorosilane is complete, the reaction mixture is heated to a temperature in the range of from about 80° to about 90° C. for about 2 to about 3 hours. The reaction mixture is washed with water until free of acid and then vacuum stripped to remove the solvent and water. The resultant fluid has a hydride content of from about 0.07 to about 0.15% by weight and the formula (V)

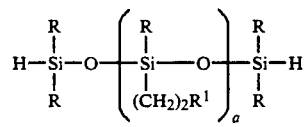

wherein R, $R^1$, and "a" are as previously described herein.

The hydride-functional fluorosilicone of formula (V) is mixed with an organic solvent, e.g., hexane, and the resulting mixture is heated to a temperature of from about 50° to about 70° C. Then, an organic solvent solution containing 4-vinylcyclohexeneoxide (VCHO) which had been previously blended with an amount of a platinum catalyst sufficient to provide from about 1 to about 10 parts per million (ppm) of platinum metal based on the total weight of the composition, is added to the hydride-functional fluorosilicone of formula (V) over a period of time ranging from about 10 to about 30 minutes. The reaction mixture is maintained at a temperature of from about 60° to about 70° C., for about 1 to about 12 hours. The organic solvent and unreacted VCHO are removed from the reaction product by vigorous agitation at a temperature of about 60° to about 120° C. for about 1 hour under a nitrogen sweep. The resulting product is an epoxy-functional fluorosilicone having the formula

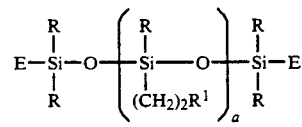

wherein E, R, $R^1$, and "a" are as previously defined.

The epoxy-functional fluorosilicone of formula (II) can be prepared as follows. A fluorosilicone telomeric disiloxanol of the general formula $HO[(R^1CH_2CH_2)(R-)SiO]H$ is agitated with an organic solvent, e.g., toluene, under a blanket of nitrogen, and to the resulting mixture are added incremental amounts of dimethylchlorosilane and an alkyldichlorosilane. After addition of the organochlorosilane and alkyldichlorosilane is complete, the reaction mixture is heated to a temperature in the range of from about 80° to about 90° C. for about 2 to about 3 hours. The reaction mixture is washed with water until free of acid and then vacuum stripped to remove the solvent and water. The resultant fluid has a hydride content of from about 0.07 to about 0.15% by weight and the formula (VI)

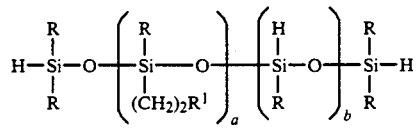

wherein R, $R^1$, "a" and "b" are as previously described herein.

The hydride-functional fluorosilicone of formula (VI) is mixed with an organic solvent, e.g., hexane, and the resulting mixture is heated to a temperature of from about 50° to about 70° C. Then, an organic solvent solution containing 4-vinylcyclohexeneoxide (VCHO) which had been previously blended with an amount of a platinum catalyst sufficient to provide from about 1 to about 10 parts per million (ppm) of platinum metal based on the total weight of the composition, is added to the hydride-functional fluorosilicone of formula (VI) over a period of time ranging from about 10 to about 30 minutes. The reaction mixture is maintained at a temperature of from about 60° to about 70° C., for about 1 to about 12 hours. The organic solvent and unreacted VCHO are removed from the reaction product by vigorous agitation at a temperature of about 60° to about 120° C. for about 1 hour under a nitrogen sweep. The resulting product is an epoxy-functional fluorosilicone having the formula

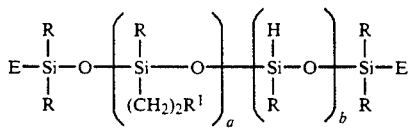

wherein E, R, $R^1$, "a" and "b" are as previously defined.

The epoxy-functional fluorosilicone resin of formula (III) can be prepared in the following manner. Methyldichlorosilane and 3,3,3-trifluoropropylmethyldichlorosilane are dissolved in dry toluene while under a nitrogen blanket. Tetraethylorthosilicate is added with agitation to the resulting mixture. After addition of the orthosilicate, the mixture is stirred for about 15 to about 30 minutes and then added incrementally to distilled water. External cooling is applied to keep the temperature at about 40° C. When the reaction subsides to about 25° C., the mixture is allowed to phase separate. The organic phase is then washed with water until the pH is about 6. The material is then heated while agitating under a slight nitrogen purge to a temperature of about 115° C. in order to remove solvent, water, and alcohol. The vessel temperature is then increased to about 150° C. over a period of about 2 to about 3 hours and additional distillate recovered. The temperature of the mixture is then increased to about 175° to about 180° C., with recovery of additional distillate. The material can then be filtered with Celite 545 and Fuller's earth in order to reduce acidity down to about 10 ppm. The resulting hydride product was a clear fluid having a hydride content of 0.14% by weight, a viscosity of about 64 centipoise at 25 centipoise at 25° C., and the following formula (VII)

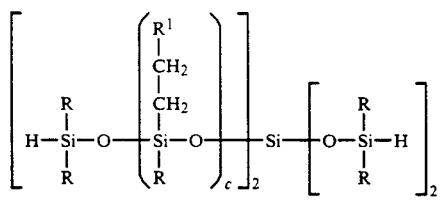

wherein R, $R^1$, and "c" are as previously defined.

The hydride-functional fluorosilicone resin of formula (VII) is mixed with a solution of VCHO and the rhodium catalyst, $RhCl(Ph_3P)_3$, wherein "Ph" represents phenyl. The mixture is brought to a temperature of from about 90° to about 120° C. when sufficient VCHO is added dropwise to react with all silicon-bonded hydrogen groups (also referred to herein as "SiH") present in the resin and held there for about 1 to about 24 hours. A stabilizer, $CH_3N(C_{18}H_{37})_2$, is optionally added as a 10% solution in organic solvent, e.g., toluene. The organic solvent and excess VCHO are removed, e.g., by distillation at a temperature of 70° to about 140° C. under a nitrogen stream. The resulting product had the formula

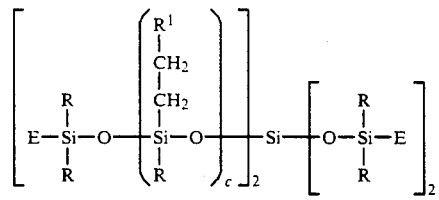

wherein E, R, $R^1$, and "c" are as previously defined.

The epoxy-functional fluorosilicone of formula (IV) can be prepared as follows.

Methylhydrogendichlorosilane and 3,3,3-trifluoropropylmethyldichlorosilane are dissolved in dry toluene while under a nitrogen blanket. Trimethoxymethylsilane is added with agitation to the resulting mixture. After addition of the trimethoxymethylsilane is complete, the mixture is stirred for about 20 to about 30 minutes and then added to distilled water. External cooling is applied to keep the temperature at about 40° C. When the reaction subsides to about 28° C., the mixture is allowed to phase separate. The organic phase is then washed with water until the pH is about 6. The material is then heated while agitating under a slight nitrogen purge to a temperature of about 148° C. in order to remove solvent, water, and alcohol. The vessel temperature is then increased to about 180° C. over a period of about 3 to about 4 hours and additional distillate recovered. The material can then be treated wiht Celite 545 and Fuller's earth in order to reduce acidity down to about 10 ppm. The resulting hydride product had a hydride content of 0.36% by weight, a viscosity of about 28.8 centipoise at 25° C., and the following formula (VIII)

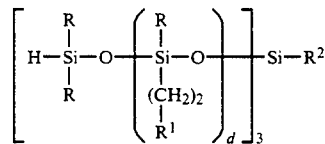

wherein R, $R^1$, $R^2$ and "d" are as previously defined.

The hydride-functional fluorosilicone of formula (VIII) is mixed with an organic solvent and a solution of $RhCl(Ph_3P)_3$ in 4-vinylcyclohexeneoxide. The mixture is brought to a temperature of from about 90° to about 120° C. when sufficient VCHO is added dropwise to react with all SiH present in the silicone resin solution, and held there for about 1 to about 24 hours. A stabilizer, methyldicocoamine in toluene, can be added. The stabilized reaction mixture is then stripped of solvent in vacuo at 70° to 160° C. The resulting product has the formula

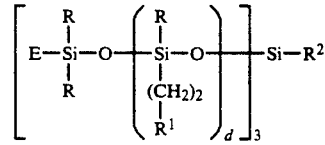

wherein R, $R^1$, $R^2$, E, and "d" are as described previously herein.

The hydrosilation catalyst used in the preparation of the epoxy-functional fluorosilicones of the present invention is a catalyst which promotes the hydrosilation reaction between the VCHO and the hydride-functional fluorosilicone. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts are disclosed, for example, in U.S. Pat. Nos. 3,159,601 and 3,159,662 (Ashby); 3,220,970 (Lamoreaux); 3,814,730 (Karstedt); 3,516,946 (Modic), and 4,029,629 (Jeram); all of the foregoing patents being hereby incorporated by reference herein. A preferred rhodium catalyst is Wilkinson's Catalyst which has the formula RhCl(Ph$_3$P)$_3$, wherein "Ph" is phenyl.

Preferably, the hydrosilation catalyst used in the present invention is a platinum-containing catalyst. Suitable platinum-containing hydrosilation catalysts include any of the well known forms of platinum that are effective for catalyzinf the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds.

Other suitable platinum-containing hydrosilation catalysts for use in the preparation of the epoxy-functional fluorosilicones of the present invention include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak. All of the U.S. Patents cited in the instant paragraph are incorporated by reference into the present disclosure.

Preferably, the platinum-containing hydrosilation catalyst is that disclosed in U.S. Pat. No. 3,814,730 to Karstedt, which is hereby incorporated by reference herein. This catalyst, which is hereinafter referred to as the "Karstedt catalyst", is derived from chloroplatinic acid which has been treated with tetramethyldivinyldisiloxane.

The present invention is further directed to UV curable compositions containing any one of the epoxy-functional fluorosilicones of the present invention in combination with a catalytic amount of an onium salt photoinitiator or combination of onium salt photoinitiators.

Onium salt photoinitiators suitable for use in this invention include those having the formulae:

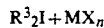

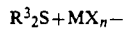

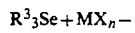

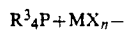

where radicals represented by R$^3$ can be the same or different organic radicals from 1 to 30 carbon atoms, including aromatic carbocyclic radicals of from 6 to 20 carbon atoms which can be substituted with from 1 to 4 monovalent radicals selected from C$_{(1-18)}$ alkoxy, C$_{(1-8)}$ alkyl, nitro, chloro, bromo, cyano, carboxy, mercapto, and the like, and also including aromatic heterocyclic radicals including, e.g., pyridyl, thiophenyl, pyranyl, and the like, and MX$_n-$ is a non-basic, non-nucleophilic anion, such as BF$_4-$, PF$_6-$, AsF$_6-$, SbF$_6-$, SbCl$_6-$, HSO$_4$, ClO$_4-$, and the like.

The preferred onium salts for use herein are the diaryliodonium salts. Examples of suitable diaryliodonium salts are disclosed, for example, in U.S. Pat. No. 4,882,201, which is incorporated herein by reference. Specific examples of other suitable diaryl iodonium salts include 4-octyloxyphenylphenyl-iodoniumhexafluoroantimonate, bis(dodecyl phenyl)iodonium hexafluoroarsenate and bis(dodecyl phenyl)iodonium hexafluoroantimonate. The most preferred of these iodonium salts is 4-octyloxyphenylphenyl-iodoniumhexafluoroantimonate.

The amount of catalyst present in the composition of this invention is not critical, so long as proper polymerization is effected. As with any catalyst, it is preferable to use the smallest effective amount possible, for the purposes herein, catalyst levels of from about 0.5%–5.0% by weight have been found suitable.

The UV-curable compositions of this invention can be prepared by combining an epoxy-functional fluorosilicones of this invention with an onium salt photoinitiator or combination of onium salt photoinitiators and exposing the mixture to an amount of ultraviolet radiation sufficient to cure the composition.

A key advantage of the UV-curable compositions of this invention is their cure efficiency. The UV-curable compositions of this invention will cure on exposure to UV radiation flux of from about 10 to about 200 millijoules/cm$^2$ for a cure time of from about 0.005 to about 0.1 seconds when two focused 300 watt/inch medium pressure mercury vapor UV lamps are used for cure.

The present invention is further directed to articles of manufacture comprising a substrate having disposed on the surface thereof a coating containing the cured composition comprising one of the epoxy-functional fluorosilicone of the present invention and an onium salt photoinitiator or combination of onium salt photoinitiators.

The articles of the present invention are prepared by applying the curable compositions of this invention to a substrate such as a circuit board if the composition is to be used as a conformal coating, thereafter exposing the coated substrate to ultraviolet radiation sufficient to cure the composition.

In order that those skilled in the art might be better able to practice the present invention, the following examples are given by way of illustration and not by way of limitation.

EXPERIMENTAL

EXAMPLE 1

Example 1 illustrates the preparation of a linear dimethyl-hydrogensiloxy-chainstopped polymethyl-3,3',3''-trifluoropropyl siloxane polymer, which is useful in making the epoxyfunctional fluorosilicone.

Fluorosilicone telomeric disiloxanol fluid of the formula HO[(CF$_3$CH$_2$CH$_2$)(CH$_3$)SiO]H (447.0 grams, 6.2 weight % OH) and reagent toluene (500.0 grams) were agitated in a flask while under a blanket of nitrogen. To this mixture were added 275 mls (88.7% reactive, 239 grams) of dimethylchlorosilane incrementally below the surface of the liquid. The reaction temperature rose from 25° C. to 30° C. and the mixture turned hazy with each increment of silane. The haze rapidly disappears to provide a clear solution. The addition was completed in thirty minutes and the contents of the vessel were heated to 80° C. for 2 hours. Fourier Transform (i.e., computer-enhanced) infrared spectral (FTIR) of the reaction mixture displays a strong band at 2310 cm$^{-1}$ for SiH and no evidence of silanol at 3400 cm$^{-1}$. Assay of the mixture indicates HCl content of 11,520 ppm. The reaction mixture was washed seven times with equal volumes of water until free of acid. The material was then vacuum stripped on a Roto-Vac at 50° C. with water aspirator to remove the solvent and water. The resultant fluid (507.3 grams, 84% recovered yield) was found to have a hydride content of 0.15 weight %, an average degree of polymerization corresponding to about 4.3 units, a viscosity of 9 centistokes at 25° C., an $N_D^{25}$ of 1.3714, and a reactive hydrogen content of 0.15%. Endgroup analysis indicated the approximate molecular structure below:

(1)

grams of a 54 centistroke viscosity fluid were ultimately isolated, having an $N_D^{25}$ of 1.4010. This product has the following approximate molecular structure:

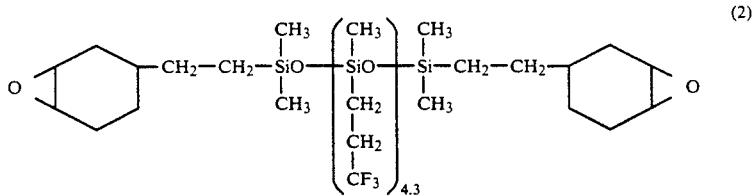

(2)

100 parts of the epoxysilicone fluid of formula (2) prepared above (hereinafter referred to as "$M^E D_{4.3}{}^R/M^E$") were mixed with 1 part of a 50% solution of 4-octyloxyphenylphenyl-iodoniumhexafluoroantimonate (OPPI) in 2-ethyl-1,3-hexanediol to form a clear photoactive solution. 2 mil films of this blend were found to cure to a smear- and migration-free coating with excellent adhesion to a polyethylene kraft substrate on exposure to 19 mJ/cm$^2$ focused ultraviolet light in an RPC model QC1202AN Lab UV Processor (300 watts total lamp power, 400 ft/min conveyer speed).

Comparison Example A

Comparison Example A illustrates the UV cure response of an epoxyfunctional non-fluoro dimethylsilicone analog.

The procedure followed in Example 2 was repeated except that the epoxyfunctional fluorosilicone prepared and cured in Example 2 was replaced by an epoxyfunctional dimethylsilicone of the formula:

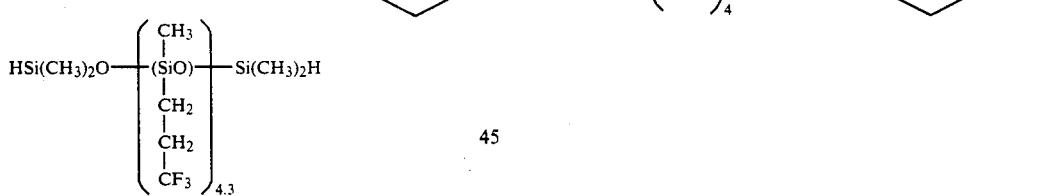

(3)

EXAMPLE 2

To a 500 cc RB flask were added 60 grams of the fluorosilicone linear hydride of formula (1) prepared in Example 1 and 60 grams of hexane. This mixture was brought to 53° C., when the heating mantle was withdrawn and a solution of 11.5 grams of 4-vinylcyclohexeneoxide previously blended with sufficient amount of Karstedt's platinum catalyst to furnish 20 ppm platinum in the olefin dispersed in 20 grams of hexane were added to the hydrogen-stopped fluorosilicone fluid over a 10 minute period. The hydrosilation reaction provided sufficient exotherm to maintain batch temperature between 53° and 56° C. throughout the addition without external heating. After the complete reaction mixture was maintained at 54° C. for 2 hours, FTIR examination of the reaction solution detected no SiH stretch at 2200 cm$^-$. Hexane and unreacted VCHO were removed from the reaction product by vigorous agitation at 80° C. for an hour under a strong nitrogen sweep. Sixty-six Cure of the epoxyfunctional dimethylsilicone of formula (3) required 29 mJ/cm$^2$ despite an overall lower epoxy equivalent weight.

Thus, the UV cure response of an epoxyfunctional fluorosilicone is superior to that of its epoxyfunctional non-fluoro dimethylsilicone analog.

EXAMPLE 3

A linear dimethylhydrogensiloxy-chainstopped polymethyl-3,3',3"-trifluoropropylsiloxane having a viscosity of 144 centistokes at 25° C. and a hydrogen content of 0.068% was prepared according to the same procedure followed in Example 1 to prepare the fluorosilicone linear hydride product therein. The fluorosilicone linear hydride used in the present example is a hazy fluid with the structure below:

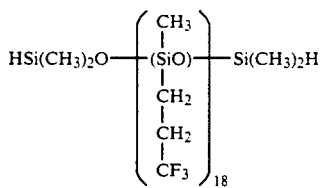

$$\text{HSi(CH}_3\text{)}_2\text{O} - \left[\begin{array}{c} \text{CH}_3 \\ | \\ \text{(SiO)} \\ | \\ \text{CH}_2 \\ | \\ \text{CH}_2 \\ | \\ \text{CF}_3 \end{array}\right]_{18} - \text{Si(CH}_3\text{)}_2\text{H} \quad (4)$$

Sixty grams of the fluorosilicone linear hydride of formula (4) (hereinafter referred to as "$M^H D^{Rf}_{18} M^H$"), having a hydride content of 0.041 mole hydrogen were weighed into a 500 ml flask with 0.05 grams of the Karstedt platinum catalyst plus 5.10 grams of 4-vinylcyclohexeneoxide (0.041 moles). This mixture was agitated at 80° C. for 16 hours, at which time no SiH was detected via FTIR analysis. The product was devolatilized in vacuo at 120° C. to afford 65 grams of a slightly hazy fluid product having a viscosity of 600 centistokes at 25° C. and an $N_D^{25}$ of 1.3925.

Because 4-vinylcyclohexeneoxide is immiscible in the hydride-stopped fluoropolymer precursor, the improved clarity of the product and the increase in fluid viscosity by 4.2 times is good evidence that the reaction product has the following structure:

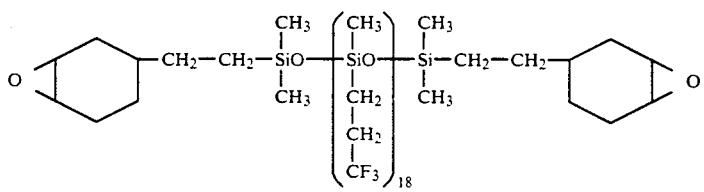

(5)

100 parts of the fluorosilicone polymer of formula (5) which is hereinafter referred to as $M^E D^{Rf}_{18} M^E$) were subsequently mixed with 1 part of a 50% solution of (4-octylphenyl)phenyl iodoniumhexafluoroantimonate (OPPI) in 2-ethyl-1,3-hexanediol, making a hazy photoreactive blend. 2 mil films of this coating mixture cured to smear- and migration-free coatings with good anchorage to polyethylene Kraft sheets upon exposure to just 19 mJ/cm² ultraviolet light flux in the RPC lab UV Processor. This result is identical to the UV flux required to cure 2 mil coatings of the epoxy-functional fluorosilicone fluid of formula (2) which is unexpected because $M^E D^{Rf}_{18} M^E$ contains only one-third of the amount of reactive crosslinkable epoxy as the lower molecular weight analog contains.

Comparison Example B

An epoxy-stopped dimethylsilicone having formula (6) below was prepared for comparison to the $M^E D^{Rf}_{18} M^E$ fluid of formula (5), prepared in Example 3 above.

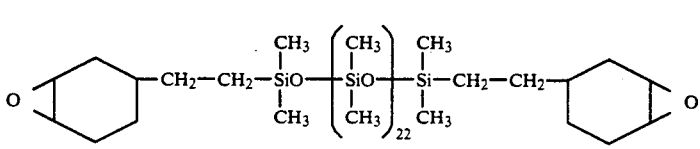

(6)

The fluid of formula (6) above is referred to hereinafter as $M^E D_{22} M^E$. This non-fluoro-containing silicone had a viscosity of 42 centistokes at 25° C., a refractive index of 1.4210, and an epoxy equivalent weight of about 1000. 2 mil coatings of the formula (6) fluid were UV-cured in the same manner and with the same catalyst as was used in the cure of the $M^E D^{Rf}_{18} M^E$ fluid in Example 3 above. The $M^E D_{22} M^E$ fluid required 39 mJ/cm² total UV flux to achieve the same degree of cure, despite an epoxy content over 1.5 times as great. All other things being equal, epoxy-fluorosilicones can be UV-cured 2 or 3 times more efficiently than their non-fluorosilicone analogs.

EXAMPLE 4 AND COMPARISON EXAMPLE C

An experiment was carried out to assess the solvent-resistance of UV-cured films of $M^E D^{Rf}_{18} M^E$ compared to non-fluoro UV-cured epoxysilicone films.

5 mil coatings of OPPI-catalyzed $M^E D^{Rf}_{18} M^E$ and $M^E D_{22} M^E$ and a 5 mil coating of an epoxyfunctional silicone having an epoxy equivalent weight of 900 which was catalyzed with 1% of a solution of bis(-dodecylphenyl)iodonium hexafluoroantimonate in 2-ethyl-1,3,-hexanediol were applied to clean glass slides, then cured with 1 pass in the RPC UV Processor operating with two 200 watts/inch UV lamps at 100 ft/min. All coatings were found to be well cured after that exposure. The coated glass slides were then partially immersed in hexane, then observed for signs of coating degradation. Both non-fluoro epoxysilicone coatings rapidly swelled, delaminated and cracked into small pieces within 60 seconds of immersion at 25° C. The UV-cured coating of $M^E D^{Rf}_{18} M^E$, by contrast, appeared quite intact after 1 hour in hexane under similar conditions, with only slight delamination observed around its edges. Such solvent resistance is an important property advantage for UV curable silicone conformal coatings used in under-the-hood automotive applications or other applications where fuel and solvent resistance are necessary.

The following examples illustrate that UV-curable epoxyfluorosilicone resins containing the "Q" structure are analogous to the linear epoxy-stopped fluorosilicones described previously herein in UV cure capability and in solvent resistance in the cured state despite relative low fluorine content.

EXAMPLE 5

An SiH-functional fluorosilicone resin believed to have the following structure was prepared:

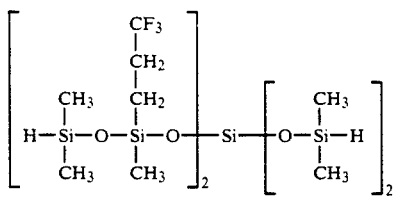
(7)

The resin of the formula above is designated herein as $(M^H D^{Rf})_2 Q M^H_2$. The resin contains a fluorine content of approximately 18.5% and a hydrogen content of 0.588%.

Twenty-five grams of the $(M^H D^{Rf})_2 Q M^H_2$ resin above (at approximately 0.115 moles of hydrogen) were weighed into a 250 cc flask with 0.70 grams of a 2% solution of $RhCl[(Ph)_3P]_3$ in 4-vinylcyclohexeneoxide (VCHO) catalyst solution. The mixture was brought to 105° C., when 20 grams (0.16 moles) of VCHO were added without any obvious reaction taking place. 0.2 grams of additional rhodium complex solution were added, followed by an 18 hour hold at 100° C., after which no SiH functionality was detected by FTIR analysis. 0.004 grams of $(CH_3)N(C_{18}H_{37})_2$ stabilizer were then added as a 10% solution in toluene. Toluene and excess VCHO were removed by distillation to 140° C. under a nitrogen stream. 40.0 grams of product were isolated as a hazy viscous fluid, 7552 centistokes viscosity, and $N^{25}_D$ of 1.4592.

The resin product was miscible with 1 weight % (4 octyloxyphenyl)phenyl iodonium hexafluoroantimonate (OPPI). 2 mil coatings of photocatalyzed resin cured to smear- and migration-free glossy coatings on PEK substrate on exposure to 31 mJ/cm² UV flux. The resin is believed to have the following structure:

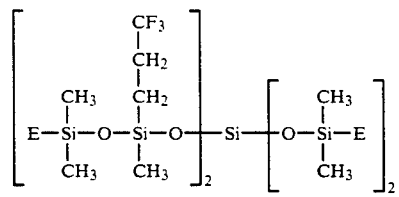
(8)

wherein E represents

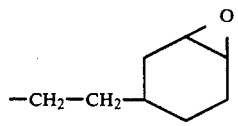

The resin of formula (8) will hereinafter be referred to as "$(M^E D^{Rf})_2 Q(M^E)_2$".

The solvent resistance of 5 mil UV-cured coatings of the epoxyfluorosilicone resin (1% OPPI) on glass was assessed as described previously herein. The one hour immersion in hexane caused only minor swelling and delamination at the bottom of the coating with no apparent effect on coating integrity at other areas directly in contact with hexane solvent.

Given the high organofunctional content and relatively low fluorine content of the epoxyfluorosilicone resin above, the observed solvent resistance is an unexpected and useful result, suggesting that these fluoroepoxysilicones are suitable for electrical encapsulation or conformal coatings where protection from solvents and fuels is required.

EXAMPLE 6

An SiH-functional fluorosilicone resin was prepared having a hydride content of 0.35 weight % and the following formula:

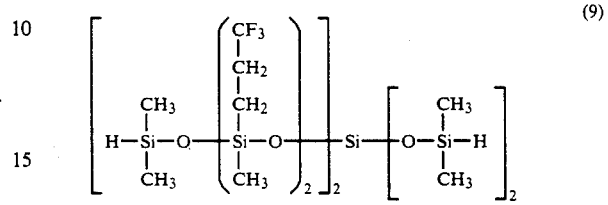
(9)

The resin of the formula above is designated herein as $[M^H(D^{Rf})_2]_2 Q M^H_2$. 28.6 grams of this SiH resin (0.1 mole H) plus 100 grams of toluene and 0.7 grams of a 0.2 weight % solution of $RhCl[(Ph)]_3$, wherein "Ph" represents phenyl, in VCHO were weighed into a 250 cc flask. The solution was heated to 102° C., then agitated while 15.0 grams of VCHO (0.12 moles ) were added dropwise. No evidence of exothermic reactions was observed. The complete reaction mixture was then held at 110° C. for 2 hours, at which time FTIR analysis confirmed that all SiH had been reacted. Solvent and excess VCHO were removed under vacuum affording 40.0 grams yield of an epoxyfluorosilicone fluid having a viscosity of 242 centistokes with $N^D_{25}$ of 1.4324 and the following structure

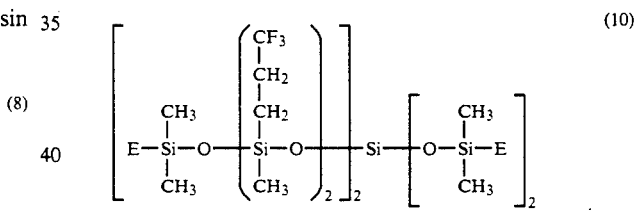
(10)

The resin of formula (10) will sometimes hereinafter be referred to as $[M^E(D^{Rf})_2]_2 Q M^E_2$.

The epoxyfluorosilicone fluid of formula (10) was completely miscible with 1.0 weight % of OPPI photocatalyst. 2 mil films of the catalyzed resin cured to smear- and migration-free coatings which anchored well to polyethylene Kraft substrates on exposure to 18 mJ/cm² total UV fluxed generated by mercury vapor lamps in an RPC QC1202 Lab Processor. This is an exceptionally efficient UV cure.

EXAMPLES 7-11

The solvent resistance of cured films of the epoxyfluorosilicones prepared in Examples 2, 3, 5, and 6, respectively, and compared to a cured film of an epoxysilicone designated as $M^E D^E_5 D_{70} M^E$ were studied. Each epoxysilicone was blended with 1 weight % OPPI by brief mixing at 60° C. 5 mil coatings of the catalyzed silicones were then manually applied to clean glass slides, then exposed to 600 mJ/cm² total UV flux in the Lab Processor unit to ensure complete cure. The coated glass slides were partially immersed in hexane for 60 minutes, while the response of these cured coatings to this aggressive solvent was observed. The results are shown in Table 1 below.

TABLE 1

Examples 7-11: Solvent Resistance Data

| Example No. | Formula | % Fluoro | EEW* | Results |
|---|---|---|---|---|
| 7 | $M^E D^{Rf}_{4.3} M^E$ | 23.3 | 527 | Rapid Swelling (2 min); lifts off glass (10 min). Cracking propagates to cured coating above immersion (30 min). Film completely delaminated as intact film (60 min). |
| 8 | $M^E D^{Rf}_{18} M^E$ | 32.2 | 1600 | No Deterioration (60 min.) |
| 9 | $(M^E D^{Rf})_2 Q M^E_2$ | 10.6 | 276 | No Deterioration (60 min.) |
| 10 | $[M^E(D^{Rf})_2]_2 Q(M^E)_2$ | 16.4 | 347 | Swelling (5 min.); cracking, delaminating (10 min.); coating cracked into small pieces detached from glass up to immersion line (60 min) |
| 11 | $M^E D^E_5 D_{70} M^E$ | 0 | 1100 | Complete delamination and destruction of coating (less than 1 min.) |

*Epoxy Equivalent Weight (calculated)

The results presented in Table 1 were surprising in that it would have been expected that the solvent resistance of the UV-cured films would increase as a function of fluorine content.

Obviously, fluorine content alone does not dictate solvent resistance; relative "Q" content seems equally important as the $(M^E D^{Rf})_2 Q M^E_2$ resin film proved much more resistant to attack by hexane than the $[M^E(D^{Rf})_2]_2 Q(M^E)_2$ resin despite the latter having a 60% greater fluorine concentration.

EXAMPLE 12

28 grams of an SiH-functional fluorosilicone resin containing 0.36% reactive hydrogen, of approximate formula

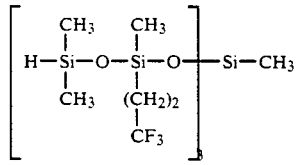

(11)

(hereinafter referred to as "$(M^H D^{Rf})_3 T$") were weighed into a 250 cc flask with 100 grams of toluene and 0.2 grams of a 2 weight % solution of Wilkinson's catalyst, i.e., $RhCl[(Ph)_3 P]_3$, in VCHO. This solution was brought to 100° C. when 15 grams of VCHO were added dropwise. Following a two hour hold at 100° C., FTIR analysis detected no unreacted SiH. 0.05 grams of a 10% solution of methyldicocoamine in toluene were then added, and the stabilized batch stripped of solvent and other light ends in vacuo at 160° C. The resulting clear stable product was a 95 centistoke fluid with a refractive index of 1.4262 and the formula

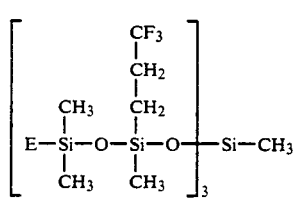

(12)

The resin of formula (12) will hereinafter be referred to as $(M^E D^{Rf})_3 T$.

UV cure and solvent resistance analysis of the T-based epoxyfluorosilicone $(M^E D^{Rf})_3 T$ resin of formula (12) was assessed as described previously herein. The extremely rapid cure response observed with other epoxyfluorosilicones was again noted here. A coating bath made up of 100/1 mix of $(M^H D^{Rf})_3 T$/OPPI photocatalyst was a clear mixture, a 2 mil thick film of which cured to a glossy coating exhibiting no migration and excellent anchorage to polyethylene kraft substrates on exposure to 12 mJ/cm$^2$UV flux, which is a very fast cure. 5 mil thick coatings of this catalyzed mixture was cured on glass slides on exposure to 600 mJ/cm$^2$ UV flux as before. This coating was partially immersed in hexane for an hour, with these observations:

1 minute: considerable swelling, no delamination
3 minute: swelling, slight delamination at bottom of coating
10 minute: same as 3 minute coating; dries out intact despite degree of swelling
30 minute: no further change
60 minute: slight delamination and cracking, but coating still dries intact.

The epoxyfunctional fluorosilicone of formula (12) had an epoxy equivalent weight of 371 and a fluorine content of 15.4% by weight

EXAMPLE 13

44 grams of an SiH-functional fluorosilicone resin containing 0.135% reactive hydrogen and having the approximate formula

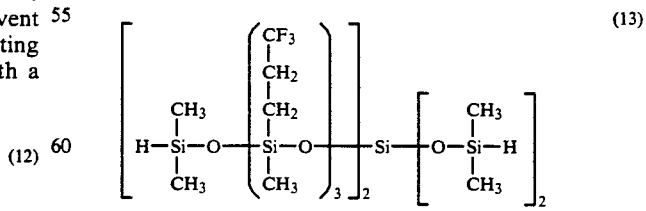

(13)

(hereinafter referred to as "$(M^H D^{Rf}_3)_2 Q M^H_2$" were weighed in a 250 cc flask with 100 grams of toluene and 0.2 grams of the same VCHO solution of $RhCl(Ph_3P)_3$ as described previously. The solution was agitated at 100° C. while 8 grams of VCHO were added dropwise, followed by a 2 hour hold at 105° C. Completion of this addition reaction required a second increment of rhodium catalyst solution plus an additional gram of VCHO. The reaction mixture was stabilized and devolatilized in the same fashion as $(M^ED^{Rf}{}_3)_2QM^E{}_2$, affording 47 grams of a slightly hazy 200 centistoke viscosity fluid product having a refractive index of 1.4012 and the approximate formula

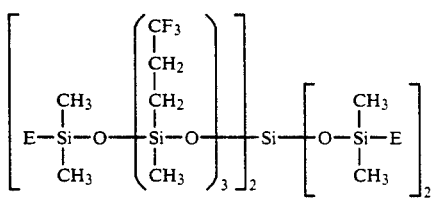
(14)

hereinafter referred to as "$(M^ED^{Rf}{}_3)_2QM^E{}_2$." Based on this formula, the product contained a fluorine content of 19.9% and had an epoxy equivalent weight of 430.

UV cure analysis was carried out on 2 mil coatings of $(M^ED^{Rf}{}_3)_2QM^E{}_2$ and 1 weight % OPPI catalyst, which appeared to be moderately soluble in the silicone. Migration- and smear-free coatings were obtained on exposure to 14 mJ/cm² focused ultraviolet light which is a very fast rate of cure. 5 mil UV cured coatings of this catalyzed mixture were prepared on glass slides; immersion of the coatings in hexane resulted in no detectable degradation, swelling, nor delamination in an hour, which is equivalent solvent resistance to the highly solvent-resistant epoxyfluorosilicone coatings described previously herein.

What is claimed is:

1. An epoxy-functional fluorosilicone selected from the group consisting of resinous epoxy-functional fluorosilicones having the general formula (III)

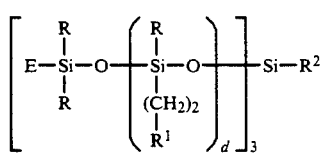

and
resinous epoxy-functional fluorosilicones having the general formula (IV)

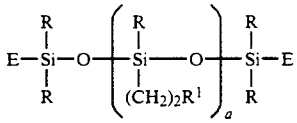

wherein E represents an epoxy-functional organic group of from about 2 to about 20 carbon atoms, R represents an alkyl radical having from 1 to about 10 carbon atoms, $R^1$ represents a perfluoroalkyl radical having from about 1 to about 8 carbon atoms, $R^2$ represents an alkyl radical having from 1 to about 10 carbon atoms, "c" represents a number from 1 to about 100, and "d" represents a number from 1 to about 100.

2. An epoxy-functional fluorosilicone according to claim 1 wherein E represents the radical

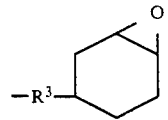

wherein $R^3$ represents an alkylene radical having from 1 to about 10 carbon atoms.

3. An epoxy-functional fluorosilicone according to claim 2 wherein $R^3$ represents an ethylene radical.

4. An epoxy-functional fluorosilicone according to claim 1 wherein $R^1$ represents the radical —$CF_3$.

5. An epoxy-functional fluorosilicone according to claim 1 wherein R represents a methyl radical.

6. An epoxy-functional fluorosilicone according to claim 1 wherein "c" represents a number from about 1 to about 20.

7. An epoxy-functional fluorosilicone according to claim 6 wherein "c" represents a number from about 1 to about 10.

8. An epoxy-functional fluorosilicone according to claim 1 wherein "d" represents a number from about 1 to about 20.

9. An epoxy-functional fluorosilicone according to claim 8 wherein "d" represents a number from about 1 to about 10.

10. An ultraviolet radiation-curable epoxy-functional fluorosilicone composition comprising:

(1) an epoxy-functional fluorosilicone selected from the group consisting of:

(A) linear epoxy-functional fluorosilicones having the general formula (I)

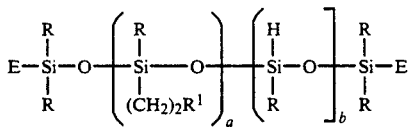

(B) epoxy-functional fluorosilicones having the general formula (II)

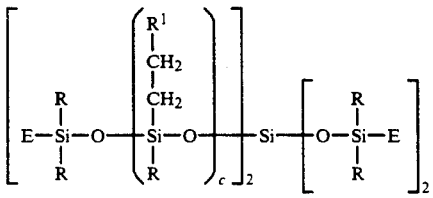

(C) resinous epoxy-functional fluorosilicones having the general formula (III)

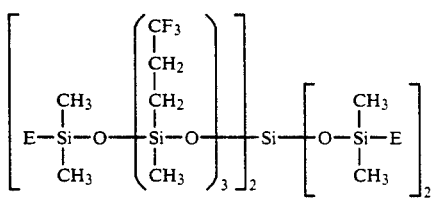

and
(D) resinous epoxy-functional fluorosilicones having the general formula (IV)

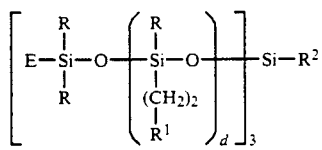

wherein E represents an epoxy-functional organic group of from about 2 to about 20 carbon atoms, R represents an alkyl radical having from 1 to about 10 carbon atoms, $R^1$ represents a perfluoroalkyl radical having from about 1 to about 8 carbon atoms, $R^2$ represents a an alkyl radical having from 1 to about 10 carbon atoms, "a" represents a number from 1 to about 100, "b" represents a number from 1 to about 100, "c" represents a number from 1 to about 100, and "d" represents a number from 1 to about 100; and (2) a catalytic amount of an onium salt photocatalyst or a combination of onium salt photocatalysts.

11. An epoxy-functional fluorosilicone composition according to claim 10 wherein E represents the radical

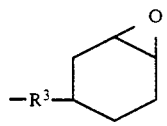

wherein $R^3$ represents an alkylene radical having from 1 to about 10 carbon atoms.

12. An epoxy-functional fluorosilicone composition according to claim 11 wherein $R^3$ represents an ethylene radical.

13. An epoxy-functional fluorosilicone composition according to claim 12 wherein $R^1$ represents the radical —$CF_3$.

14. An epoxy-functional fluorosilicone composition according to claim 13 wherein R represents a methyl radical.

15. An epoxy-functional fluorosilicone composition according to claim 10 wherein "a" represents a number from about 3 to about 30.

16. An epoxy-functional fluorosilicone composition according to claim 15 wherein, "a" represents a number from about 10 to about 20.

17. An epoxy-functional fluorosilicone composition according to claim 10 wherein "b" represents a number from about 3 to about 30.

18. An epoxy-functional fluorosilicone composition according to claim 17 wherein "b" represents a number from about 10 to about 20.

19. An epoxy-functional fluorosilicone composition according to claim 10 wherein "c" represents a number from about 1 to about 20.

20. An epoxy-functional fluorosilicone composition according to claim 10 wherein "c" represents a number from about 1 to about 10.

21. An epoxy-functional fluorosilicone composition according to claim 10 wherein "d" represents a number from about 1 to about 20.

22. An epoxy-functional fluorosilicone composition according to claim 10 wherein "d" represents a number from about 1 to about 10.

23. An epoxy-functional fluorosilicone composition according to claim 10 wherein the photocatalyst (2) is present in an amount within the range of about 0.5% to about 5.0% by weight based on the weight of the epoxy-functional fluorosilicone.

24. An epoxy-functional fluorosilicone composition according to claim 10 wherein the photocatalyst (2) is a diaryliodonium salt.

25. An epoxy-functional fluorosilicone composition according to claim 24 wherein the photocatalyst (2) is 4-octyloxyphenylphenyliodoniumhexafluoroantimonate.

26. The cured composition of claim 10.

27. An article of manufacture comprising a substrate having disposed on the surface thereof the curable composition of claim 10.

28. An article according to claim 27 wherein the substrate is a circuit board.

29. An article a manufacture comprising a substrate having disposed on the surface thereof the cured composition of claim 14.

30. An article according to claim 29 wherein the substrate is a circuit board.

31. The composition of claim 10 wherein the epoxy-functional fluorosilicone is a resinous epoxy-functional fluorosilicone.

* * * * *